United States Patent [19]

Baird et al.

[11] Patent Number: 5,225,488

[45] Date of Patent: Jul. 6, 1993

[54] MIXING PROCESS FOR GENERATING IN-SITU REINFORCED THERMOPLASTICS

[75] Inventors: Donald G. Baird; Ashish Sukhadia, both of Blacksburg, Va.

[73] Assignees: Virginia Polytechnic Institute & State University; Virginia Tech Intellectual Properties, Inc., both of Blacksburg; Center for Innovative Technology, Herndon, all of Va.

[21] Appl. No.: 694,123

[22] Filed: May 1, 1991

[51] Int. Cl.$^5$ ...................... C08L 67/02; C08L 67/03; C08L 67/04; C08L 23/12

[52] U.S. Cl. .................................. 525/132; 525/425; 525/437; 525/444; 525/450

[58] Field of Search ............... 525/132, 444, 425, 437, 525/450

[56] References Cited

U.S. PATENT DOCUMENTS

| | | |
|---|---|---|
| 3,937,772 | 2/1976 | Urban et al. |
| 4,012,348 | 3/1977 | Chelland et al. |
| 4,433,083 | 2/1984 | Cogswell et al. |
| 4,547,541 | 10/1985 | Golba |
| 4,728,698 | 3/1988 | Isayev ................................. 525/439 |
| 4,919,875 | 4/1990 | Wang |

FOREIGN PATENT DOCUMENTS

| | | |
|---|---|---|
| 0217563 | 8/1986 | European Pat. Off. |
| 0291323 | 5/1988 | European Pat. Off. |
| 0340655 | 5/1989 | European Pat. Off. |

OTHER PUBLICATIONS

"The Morphology and Rheology of Polymer Blends Containing a Liquid Crystal Copolyester"; Blizard & Baird; Polym. Eng. Sci.; vol. 27, No. 9; 1987.

"Novel Reinforced Polymers Based on Blends of Polystyrene and a Thermotropic Liquid Crystalline Polymer"; Weiss et al.; Polym. Eng. Sci.; vol. 27; No. 9, pp. 684–691; 1987.

"Polymer Blends Containing Liquid Crystals: A Review"; Dutta et al.; Polym. Eng. Sci.; vol. 30; No. 17, pp. 1005–1018; 1990.

"Blending Breakthrough Combines Strength of Liquid Crystal Polymer With Economy of Polypropylene"; James R. Best, Editor; Thermoplastics Marketing Newsletter; vol. XIV; No. 29; Jul. 16, 1990.

"Generation of Thermoplastic Composites from Blends of Liquid Crystalline Polymers with Polypropylene"; Done et al.; ANTEC '90; pp. 1857–1860.

*Primary Examiner*—Patricia A. Short
*Attorney, Agent, or Firm*—Whitham & Marhoefer

[57] ABSTRACT

A method for blending polymeric materials includes the steps of producing a melt stream of a first polymer from a first extruder (12) and a separate melt stream of a second polymer from a second extruder (14), joining the melt streams at a T-junction (16), distributing the first polymer within said second polymer using a static mixer (10), and extruding the blend through a die (18). In particular, using this method liquid crystal polymer fiber reinforcement can be formed in-situ within a matrix material.

9 Claims, 8 Drawing Sheets

FIG. 3

| SAMPLE-# | PURE PET | | 96/4 (M) | | 90/10 (M) | | 70/30 (M) | |
|---|---|---|---|---|---|---|---|---|
| | D.R. | E [GPa] | D.R. | E [GPa] | D.R. | E [GPa] | D.R. | E [GPa] |
| 1 | 5.36 | 2.86 (0.07) | 5.0 | 3.11 (0.07) | 2.89 | 4.49 (0.67) | 2.36 | 5.45 (0.58) |
| 2 | 19.1 | 2.51 (0.23) | 10.4 | 3.37 (0.07) | 7.67 | 6.05 (0.49) | 3.25 | 6.97 (0.34) |
| 3 | 33.4 | 2.02 (0.08) | 17.3 | 3.45 (0.23) | 12.4 | 7.91 (0.42) | 3.80 | 8.93 (0.39) |
| 4 | | | 26.04 | 4.97 (0.06) | 35.5 | 8.82 (0.88) | 39.0 | 13.31 (0.37) |
| 5 | | | 45.28 | 4.86 (0.15) | 69.0 | 9.60 (0.88) | 43.2 | 17.21 (0.13) |
| 6 | | | 67.0 | 5.15 (0.49) | 156 | 12.57 (0.24) | 49.7 | 18.99 (0.17) |

DRAW RATIO (D.R.) VS YOUNG'S MODULUS (E)

| MIXING DEVICE RODS | | SINGLE-SCREW RODS | |
|---|---|---|---|
| DRAW RATIO | YOUNG'S MODULUS [GPa] | DRAW RATIO | YOUNG'S MODULUS [GPa] |
| 2.36 | 5.45 (0.58) | 4.55 | 3.98 (0.23) |
| 3.25 | 6.97 (0.34) | 7.10 | 7.08 (0.82) |
| 39.0 | 13.31 (0.37) | 13.0 | 8.05 (0.09) |
| 43.2 | 17.21 (0.13) | 20.0 | 8.49 (0.54) |
| 49.7 | 18.99 (0.17) | 49 | 13.39 (0.45) |

FIG. 9

| MATERIAL | DRAW RATIO | YOUNG'S MODULUS* (GPa) |
|---|---|---|
| POLYPROPYLENE (PP) | 6.25<br>21.16 | 0.688 (0.047)<br>0.432 (0.066) |
| PP/VECTRA B 88/12 | 3.11<br>6.26<br>13.97<br>40.85 | 1.59 (0.25)<br>2.07 (0.13)<br>2.09 (0.19)<br>2.73 (0.21) |
| PP/VECTRA B 74/26 | 4.33<br>20.16<br>35.40 | 6.5 (1.25)<br>10.96 (1.14)<br>13.47 (1.78) |
| PP/VECTRA A 72/28 | 3.80<br>8.07<br>39.06 | 3.837 (0.351)<br>4.211 (0.5)<br>4.711 (0.474) |

MIXING PROCESS FOR GENERATING IN-SITU REINFORCED THERMOPLASTICS

This invention was made with U.S. Government support under grant 230-11-11 of 102-352302 awarded by the Army Research Office. The government has certain rights in the invention.

DESCRIPTION

BACKGROUND OF THE INVENTION

1. Field of the Invention

The present invention generally relates to a process for making blends or composites of two or more polymers wherein a continuous fibrillar morphology is formed in-situ within a matrix. The invention has particular application in producing in situ fibrillar liquid crystal polymer reinforced thermoplastic materials.

2. Description of the Prior Art

Reinforced polymer composites are well known and widely used. By combining appropriate fiber or particulate reinforcing materials with a polymer matrix, improved strength and stiffness qualities are achieved. Examples of reinforcing material fillers include glass fibers, carbon fibers, aramid fibers, mica, calcium carbonate and talc. Examples of base matrix polymers which have been compounded with reinforcing material fillers include a wide range of thermoplastics such as polyethylene, polypropylene, polystyrene, polyamides and polyesters such as poly(ethylene terephthalate). In addition, it is known to combine reinforcing material fillers with high performance polymers, which are often referred to as engineering thermoplastics, such as poly(ether ether ketone) (PEEK), poly(phenylene sulphide) (PPS), polycarbonate, and the like.

Recently, there has been much research directed toward developing "self-reinforced" polymer composites which would comprise continuous and unidirectional fibers of one material which are formed in-situ in a thermoplastic matrix material. A difficulty which must be overcome in the production of "self-reinforced" polymer composites is that, with some exceptions, most polymer blends are immiscible and consequently form two phases upon mixing. In general, one component forms the continuous phase (matrix component) while the other phase is dispersed (dispersed component) in the matrix. The morphology of the blend, which concerns the size, shape and degree of the dispersion, depends on a number of different factors such as viscosity ratio, composition ratio, interfacial tension, temperature, type of flow field, elasticity ratio, residence time, intensity of mixing, and the like. A combination of some or all of these factors are often referred to as processing conditions. Different morphologies with the same polymer-polymer system may be obtained under different processing conditions. In the case of the in situ composites made with liquid crystal polymer (LCP) materials, the desired morphology would be to have the LCP phase form long, continuous fibrils in the thermoplastic matrix.

Formation of long, continuous LCP fibrils would provide effective reinforcement of a thermoplastic matrix and would result in the composite having enhanced strength and stiffness properties. However, it is well known that the viscosity of the LCP phase should be lower than that of the matrix phase during processing in order to produce the LCP fibrils. Furthermore, once the LCP fibrils are formed, they will be stable, meaning they will not break up into droplets, for longer periods of time typically only if the magnitude of the matrix viscosity itself is high. These conditions are difficult, if not impossible, to achieve when blending certain thermoplastic/LCP polymer pairs in the same apparatus (e.g., single screw extruder or twin screw extruder).

Despite these complications, fiber formation in thermoplastic matrixes has been achieved for particular thermoplastic/LCP polymer pairs. Blizard and Baird, in *Polym. Eng. Sci.*, Vol. 27, No. 9, (1987), studied blends of PET/60 PHB (a liquid crystalline copolyester of 60 mol % p-hydroxybenzoic acid and 40 mol % poly(ethylene terephthalate) with nylon 6,6 or polycarbonate (PC). The Blizard work indicated that LCP microfibrils can be generated at certain compositions, particularly under the influence of extensional flows. Weiss et al., in *Polym. Eng. Sci.*, 27, 684 (1987), extruded fibers (strands or filaments) of blends of a low molecular weight LCP with polystyrene, with the LCP composition being less than 10 weight percent in the blend, and reported some enhancement (ca. 50%) in the tensile properties of the fibers due to the reinforcing effect of the LCP fibrils.

Further discussions on the morphology and mechanical properties of LCP blends may be found in a recent review by Dutta et al., in *Polym. Eng. Sci.*, 30(17), 1005 (1990). In a majority of the studies, the mixing or blending was done either in a single screw extruder or a single screw extruder in series with a static mixer or a twin screw extruder or in an injection molding unit. The function of these mixing apparatuses is to provide a good dispersion of the minor component in the matrix. However, the dispersion of the LCP in the matrix created by the single screw extruder or twin screw extruder is in the form of LCP droplets. Further extensional deformation, such as that provided in the converging section of capillary dies and/or that provided by drawing at the die exit, is required to convert these LCP droplets into elongated structures. These elongated structures may then in turn form more continuous, fibrillar structures provided the concentration of the dispersed phase is high enough to allow the individual elongated structures to coalesce and thus attain more continuity. Typically, the LCP phase should constitute at least 10-15 weight percent of the blend in order for the droplets to be able to elongate and join for fiber formation at the die. In addition, the morphology of the blends formed by extrusion out of a single or twin screw extruder often have a skin-core type of structure with fibrous LCP present in the skin region and LCP droplets in the core region. This morphology is not very desirable since the LCP droplets in the core do not contribute to the mechanical property enhancement of the matrix material and, thus, represent less than optimal reinforcement.

Isayev and Modic in European Patent Application 0,217,563 (1986) and Isayev and Swaminathan in European Patent Application 0,291,323 (1988) disclose the in-situ formation of LCP or aromatic polyester fibers in thermoplastic matrix materials, respectively. In both Isayev et al. patent applications, the matrix and fiber forming materials are blended together in a single screw or twin screw extruder in series with a static mixer. Because the materials are processed simultaneously, the processing temperatures of the fiber-forming phase and the matrix forming phase must overlap, otherwise, the matrix forming phase will be severely degraded during processing.

U.S. Pat. No. 4,547,541 to Golba and European Patent Application 0,340,655 (1988) to Federici et al. are both directed to blending processes where two or more components of the blend are melted separately and then combined in an extruder. Melting polymers separately solves the situation where the polymer materials have incompatible processing temperatures, especially if, as taught in Federici, an LCP, which is capable of supercooling such that it is molten at a temperature below its melting point after melting, is to be combined with a lower melting point matrix polymer. In Golba, the melt from a single screw extruder is fed directly into a twin screw extruder at a point down stream from the feed hopper of the twin screw extruder. The two molten compositions are then blended in the remaining portion of the twin screw extruder. In Federici et al., the melt feed from one extruder is fed directly into another extruder containing the other thermoplastic melt. A problem with both the Golba and Federici et al. methods is that they rely on an extruder to mix the melted materials. As discussed above in conjunction with Dutta et al. review in *Polym. Eng. Sci.*, 30(17), 1005 (1990), an extruder primarily provides a dispersion of one material with another (although some distribution is achieved), and if an LCP is being blended with a thermoplastic material, the LCP will be present as droplets in the blend exiting from the extruder. While the droplets may be elongated to form fibers using a die or perhaps even a down stream static mixer, the fibers typically have a skin-core type of structure where the skin is fibrous but the core is still in the form of an LCP droplet. Such fibers do not optimally reinforce the matrix materials. In addition, there are practical limits to the amount of LCP required to form these fibers. Because an extruder operates by moving the stream forward while simultaneously causing a portion to move horizontally, the LCP droplets are separated from each other. Hence, upon elongation there must be a sufficient amount of LCP present to allow the elongated droplets created by the die to touch and form a fiber. Typically, a minimum of 10-15 wt % of the blend should be LCP before fibers will form.

SUMMARY OF THE INVENTION

It is therefore an object of this invention to provide a method of forming blends of two or more polymers which provide for enhanced in-situ fiber formation in the blends.

It is another object of this invention to provide a process for forming products such as rods, strands, tubular blown-film, films, sheets, pipes, and the like, from thermoplastic/LCP blends having significantly enhanced mechanical properties over that of the pure thermoplastic due to the in-situ formation of LCP reinforcing fibers.

It is another object of this invention to provide a method of blending polymers which do not have overlapping thermal processing temperatures.

It is another object of this invention to provide a process for forming in-situ long, high aspect ratio, LCP fibrils within a continuous or matrix phase without the use of extensional flow fields.

It is yet another object of this invention to provide a process for forming LCP fibrils in-situ within a thermoplastic matrix with the LCP constituting less than 10 wt% of the blend.

It is yet another object of this invention to provide a method of making pellets of thermoplastic blends with LCPs where the LCP has a higher thermal processing temperature than the matrix polymer in which the LCP phase is present in the form of a highly oriented, fibrillar structure, such that the pellets may be subsequently reprocessed at temperatures which are suitable for processing the matrix polymer.

According to the invention, two or more polymers which may or may not have overlapping thermal processing temperatures are separately melted and extruded. The melt streams from the extruders are subsequently combined in a static mixer which distributes the streams such that long, continuous fibrils are formed in-situ in the matrix polymer. The fibrils reinforce the matrix polymer and provide enhanced strength and stiffness characteristics. The blend emanating from the static mixer can subsequently pass through a die to form desired articles such as rods, strands, films, sheets, pipes, or the like, or can be pelletized for later reprocessing. However, the blend stream emanating from the static mixer can itself be used directly and will include continuous fibrils formed in-situ in the matrix material. The invention has particular application in the in-situ formation of LCP fibrils in thermoplastic matrix materials where the LCP and the thermoplastic do not have overlapping thermal processing temperatures.

BRIEF DESCRIPTION OF THE DRAWINGS

The foregoing and other objects, aspects and advantages will be better understood from the following detailed description of a preferred embodiment of the invention with reference to the drawings, in which:

FIG. 3 is a table showing the tensile modulus as a function of the draw ratio for pure polyethylene terephthalate (PET) and blends of PET and Vectra A at composition ratios of 96/4, 90/10, and 70/30;

FIG. 9 is a table showing the tensile modulus as a function of draw ratio for blends of polypropylene and Vectra A900 and Vectra B950 liquid crystal polymers.

DETAILED DESCRIPTION OF THE PREFERRED EMBODIMENTS OF THE INVENTION

Figure 1:
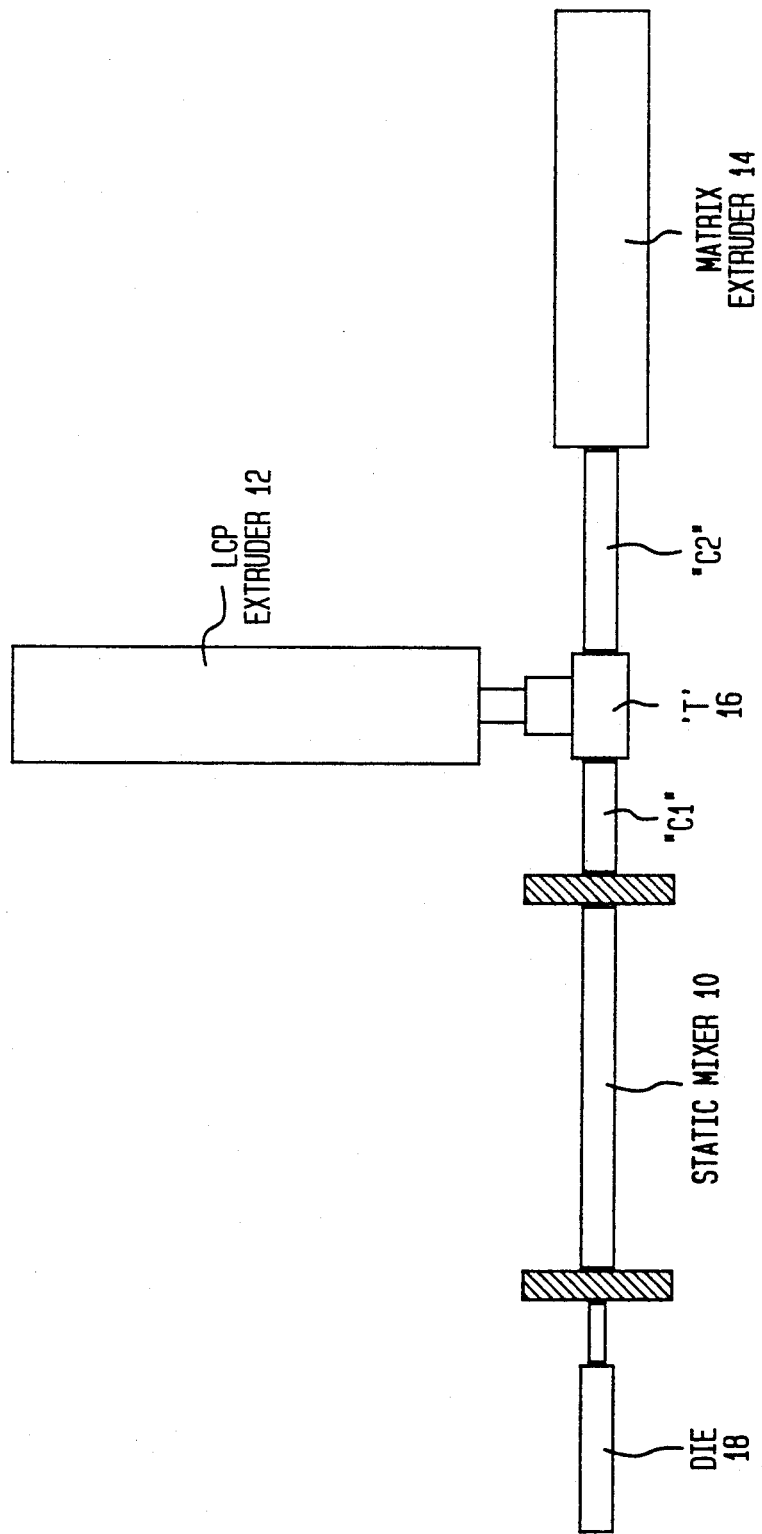
FIG. 1 is a schematic drawing of an apparatus used to combine the melt streams from two separate extruders at a static mixer to achieve in-situ fibril formation as contemplated by the present invention.

Referring now to the drawings and, more particularly to FIG. 1, there is shown a static mixer 10 located down stream of first and second extruders 12 and 14, respectively, where the melt streams from the first and second extruders 12 and 14 are joined at T-junction 16 before being combined at static mixer 10. The important feature of this invention is that the melt streams emanating from the first and second extruders 12 and 14 are combined in a distributive manner at the static mixer 10. The melt streams are not combined in a dispersive element such as an extruder. Static mixers 10 have a predominantly distributive mixing capability and are known to mix two or more materials by dividing the streams into layers and then subsequently recombining them in geometrically different configurations. This mode of mixing can prevent the formation of skin-core type structures as well as the breakup of the dispersed phase into small droplets, both of which are problems that result when an extruder is used to combine two separate melt streams. Hence, the static mixer maintains an axial continuity of the dispersed phase. Furthermore, mixing in static mixers occurs at lower shear rates and lower total strain as compared to that for single screw or twin screw extruders under comparable flow conditions (i.e., flow rates, pressure drop, etc.). Preferably, the static mixer 10 will have an inner diameter which is one half the diameter of the second or "matrix" extruder 14 and will have greater than 9 elements (preferably it will have 18 elements). A Kenics static mixer 10 is recommended, but the operational principles of static mixers is the same so most types of static mixers 10 should be acceptable. Sizing and the number of elements for a given static mixer 10 may be estimated in advance on the basis of the manufacturer's data sheets and the flow conditions of interest, e.g., flow rates, pressure drops, and the like.

The two polymers to be blended using the inventive technique can have overlapping or non-overlapping thermal processing ranges where an overlapping thermal processing range is defined as one where the temperature required to melt and process a first polymer is high enough to melt a second polymer in the blend but low enough not to cause degradation of the second polymer. However, it is anticipated that the invention will have particular benefit in combining polymer materials which do not have overlapping thermal processing ranges. In particular, this mixing mechanism is favorable for blending thermoplastics with LCPs where the thermoplastics constitute the matrix phase and the LCPs constitute the dispersed phase. Hence, FIG. 1 has been noted for exemplary purposes with the first extruder 12 labeled as the LCP extruder and the second extruder 14 has been noted as the "matrix" extruder for the matrix polymer. Thermoplastics such as polyolefins typically have low melting points and LCPs typically have high melting points. Since the LCP phase forms continuous layers or striations, a homogeneous blend containing a continuous fibrillar LCP morphology can be produced.

While not shown in FIG. 1, more than two polymers can be combined using the inventive technique where additional extruders are provided for the additional polymers. The extruders 12 and 14 may be single screw extruders, twin screw extruders, tandem extruders, or the like. More generally, any device capable of plasticating and pumping polymeric materials may be used to create the two molten streams. After the static mixer thoroughly distributes the dispersed phase from extruder 12 within the matrix material, the blend may then be passed through an extrusion die 18 for producing finished articles such as strands, films, sheets, blown films, pipes, and the like. Unlike prior art mixing techniques which rely on the die 18 to elongate the dispersed phase droplets to create a continuous fiber, the blend emanating from the static mixer 10 already has long, continuous fibers forming in-situ in the matrix material. Therefore, the die 18 is not required for creation of the in-situ fibers in the present invention, but it does aid in elongating the fibers and in producing finished articles. The blend may also be pelletized for reprocessing by another manufacturer. If the pellets included an LCP mixed with a polyolefin, the later processing might need to be performed at a temperature which melts the polyolefin, but which is not high enough to melt the LCP, since using the melting point temperature of the LCP may cause degradation of the polyolefin. Nevertheless, the polyolefin in the pellets could be melted to allow flow and the articles produced would still have some partial LCP fiber reinforcement since the LCP fibers would run the length of the pellets used.

Another advantage of the present invention over the prior art is that by combining the melted streams of polymeric materials, rather than dumping one stream of an extruder into another extruder for extruding the second polymer as taught in the European Patent Application to Federici et al., better temperature control can be achieved. Preferably, the matrix component is cooled in section C2 to a temperature equal or somewhat lower than its nominal melting temperature, or flow temperature in the case of an amorphous polymer, before the dispersion phase melt (which can be LCP) is introduced. The purpose of this step is two-fold and can be important in realizing the objective of obtaining LCP fibrillar structures.

First, by cooling the matrix polymer, both the viscosity and melt strength of the matrix polymer may be increased. This improved viscosity of the matrix would ensure that the viscosity of the matrix is higher than that of the LCP phase when the two streams are contacted and mixed in the static mixer 10 where all the blending or mixing occurs. In addition, due to the improved melt strength of the matrix polymer, significant drawing, if desired, can be achieved. Second, due to the heat-transfer effect when the hotter LCP melt contacts the cooler matrix melt, the temperature of the mixed melt blend will lie intermediate to the temperatures of the two individual melt streams before contact. By cooling the matrix melt before its contact with the hotter LCP melt, it becomes possible to ensure that the melt blend temperature does not exceed the upper processing temperature limit of the matrix polymer (above which significant degradation or undesirable chemical reaction may likely be promoted).

Although contact of the melt streams can be achieved by alternative mechanisms, preferably the two streams are contacted by the introduction of the minor component (LCP or other dispersed phase) into the center of the matrix melt stream with the angle of introduction being 90° as shown in FIG. 1. Section C2 can be an appropriate length of pipe in which to cool the matrix polymer ranging between 8–10 inches long, but may be as low as 2-3 inches and as much as 18-20 inches depending on the required heat-transfer. Additionally, a second cooling section C1 can be provided after the T-junction 16 and before the static mixer 10. Like section C2, the cooling section C1 can allow for an increase in viscosity and melt strength of each of the polymers before mixing in the static mixer 10. As is well known in the art, LCP materials are capable of "supercooling" such that they can flow below their melting point temperature.

As will be discussed in detail below in the Examples, particular blends which produced in-situ fiber reinforced materials have been produced. The materials used are commercially available and are discussed for illustration purposes only and are not meant to limit the types of polymers which may be combined within the scope of this invention. polyethylene terephthalate (PET) was obtained from Goodyear Tire and Rubber Company, Akron, Ohio, and polypropylene (PP), known commercially as Profax-6823, was obtained from the Himont Company. Both PET and PP were used as matrix polymers. The dispersed phase polymers were all liquid crystal polymers and included: a copolyester of 27 mole % 2-hydroxy-6-napthoic acid (HNA) and 73 mole % hydroxybenzoic acid (HBA), commercially known as Vectra A900 which is marketed by the Celanese Corporation; a liquid crystal polyesteramide composed of 58 mole % HNA, 21 mole % terephthalic acid (TPA) and 21 mole % 4'-hydroxy acetanilide, commercially known as Vectra B950 and marketed by the Celanese Corporation; a copolyester believed to comprise of TPA, hydroquinone and phenyl hydroquinone known as HX-4000, which is available from the DuPont Company; a copolyester of 80 mole % PET/20 mole % para-hydroxybenzoic acid (PHB) (LCP80); a copolyester of 60 mole % PET/40 mole % PHB (LCP60); and a blend of LCP60/LCP80 (50/50 weight %)(LCP60-80).

EXAMPLE I

PET and VECTRA A900, which have an overlap of their nominal thermal processing temperature ranges have been blended. The PET used had a melting point of 260.4° C. as determined by differential scanning calorimetry (DSC) and is normally processed in the temperature range of 270°-290° C. The number average molecular weight, Mn, of the PET is reported to be 42,000 with a polydispersity index (Mw/Mn) of about 2. Vectra A900 is reported to have a melting temperature of 283° C. and is normally processed at temperatures between 290°-330° C. The glass transition temperatures of PET and Vectra A900 are about 80° C. and 110° C., respectively. Due to the nature of the blending technique, several different temperature zones had to be employed such that the temperature profile of the materials could be carefully controlled so that the temperature of the matrix material did not exceed or approach its degradation temperature.

Figure 2:
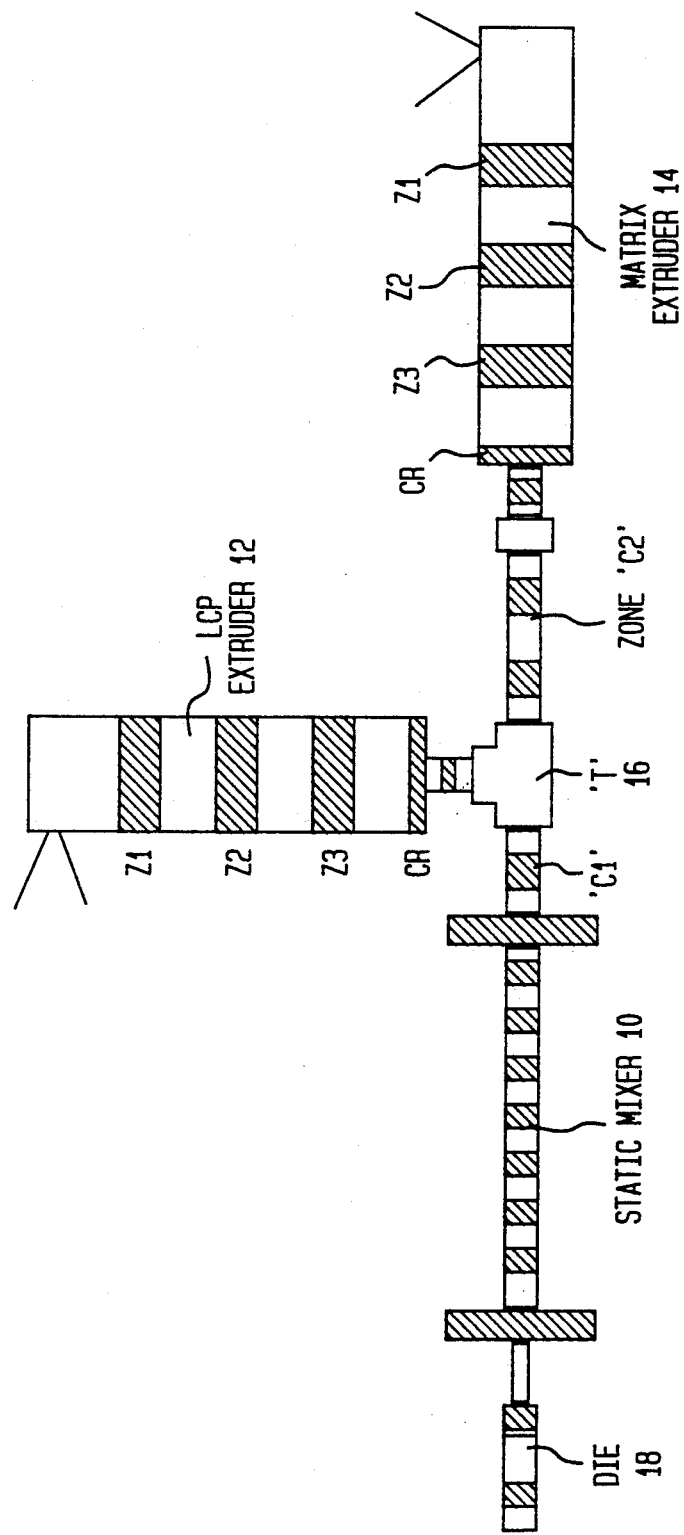
FIG. 2 is a schematic drawing of the apparatus shown in FIG. 1 which highlights the different heating zones used for improved temperature control.

FIG. 2 shows the same mixing set up shown in FIG. 1 and identifies a number of heating zones. The temperature profile in each of the different zones for the current example was as follows:

PET extruder (Matrix Extruder 14)-zone 1°=200° C., zone 2°=295° C., zone 3°=290° C., and clamp ring (CR)=220° C.;

Vectra extruder (LCP Extruder 12)-zone 1°=265° C., zone 2°=300° C., zone 3°=330° C., and CR=290° C.;

Cooling Zones 'C1' and 'C2' were maintained at 240° C. and 220° C., respectively;

Static Mixer 10 was maintained at 220° C. throughout; and

Die 18 temperature was maintained at 200° C.

FIG. 3 reports the tensile moduli as a function of draw ratio for strands of pure PET and PET/Vectra A900 blends which were produced using the inventive technique. The PET/Vectra A900 blends had three different compositions ratios; specifically, 96/4, 90/10 and 70/30 by weight. By comparing the tensile moduli, which are reported in gigapascals (GPa), it can be seen that the inclusion of Vectra A900 fibrils in the PET matrix resulted in a significant increase in the tensile modulus of pure PET for all the blends. The increase in tensile modulus increased with increasing concentrations of Vectra A900. It is also noted that fiber formation was observed when the Vectra A900 constituted as little as 4 weight percent of the blend.

Figures 4, 7:
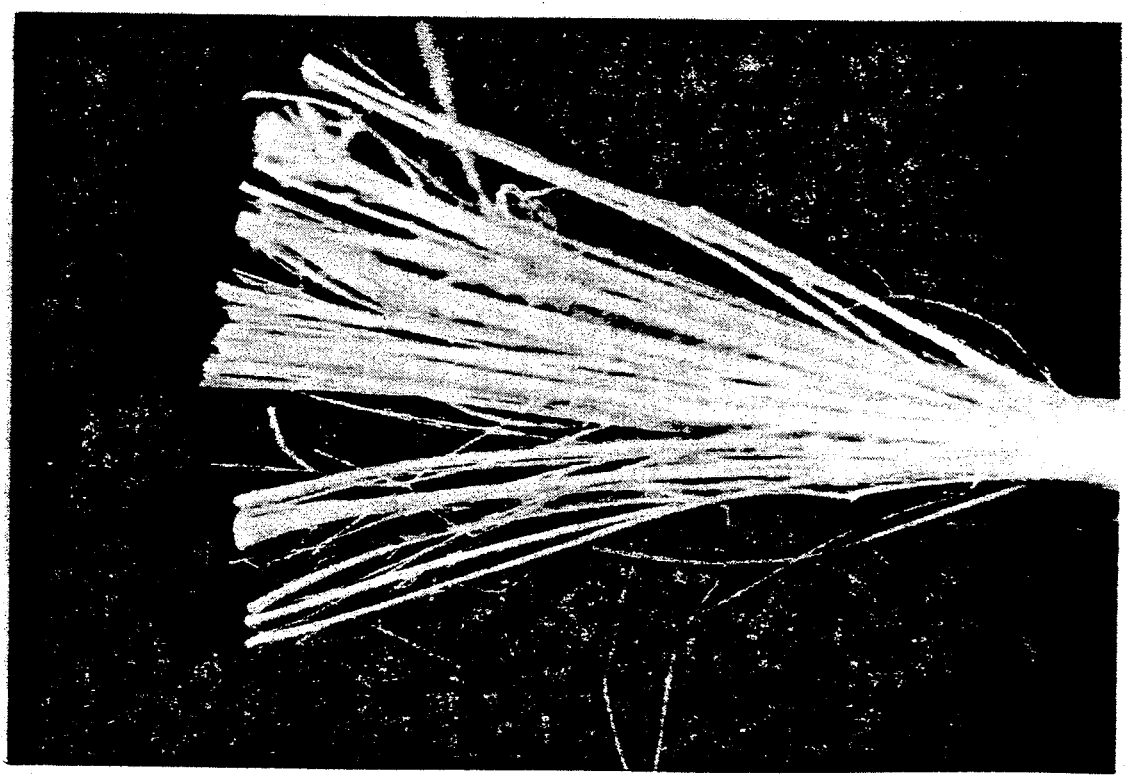
FIG. 4 is a table showing a comparison of the tensile modulus as a function of draw ratio for PET/Vectra A 70/30 blends processed by the inventive method and processed only in a single screw extruder.
FIG. 7 is a photograph of the residue of a PET/Vectra A 70/30 strand etched in n-propylamine for 72 hours.

FIG. 4 presents a comparison of the tensile moduli (Young's Modulus reported in GPa) of the PET/Vectra A900 70/30 composition ratio by weight blend made by the inventive technique and an identical composition extruded using a single screw extruder alone. The PET/Vectra A900 70/30 blend made using the inventive technique is described in detail in conjunction with FIG. 3. The PET/Vectra A900 70/30 blend processed in the same extruder was made by tumbling pellets of the two polymers in the 70/30 weight ratio in a container and feeding them to the hopper of a single screw extruder. The temperature profile used for this extrusion was as follows: 240° C., 320° C., 300° C., 250° C. and 220° C. in Zones 1-3 of the extruder, clamp ring and capillary die, respectively. In both of the above processes, the capillary die used had a diameter of 0.3175 cm and a length to diameter (L/D) ratio of 1. The PET/Vectra A900 70/30 blend produced using the inventive technique of combining two melt streams had a tensile modulus of 18.99 GPa, compared to 13.39 GPa for the blend produced using the single screw process where both were compared at a draw ratio of approximately 49. Both methods, of course, produced blends that had significantly larger tensile moduli than that for pure PET strands extruded from a single extruder which had a tensile modulus of 2.02 GPa.

Figure 5A:
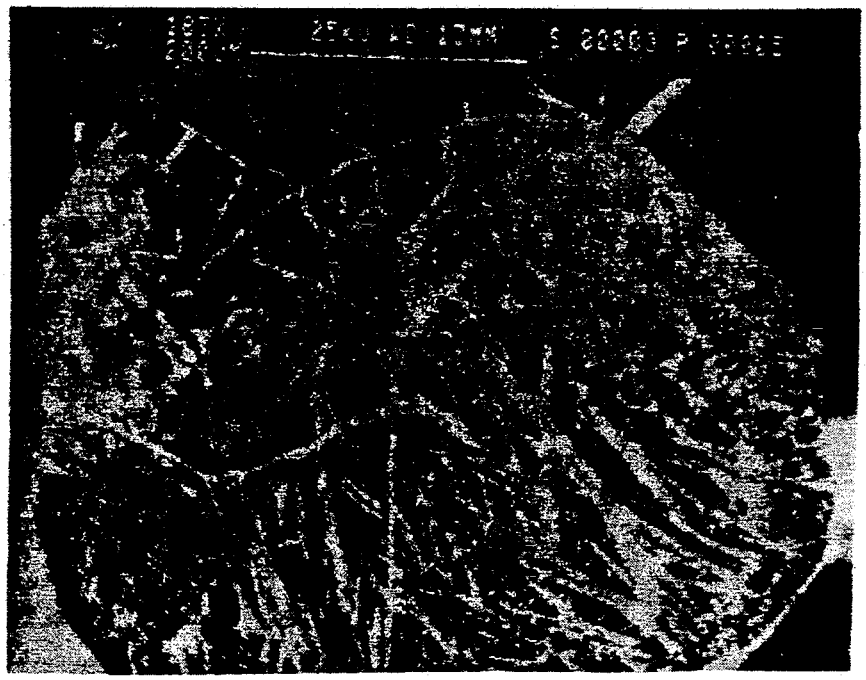
FIGS. 5a–b are scanning electron micrographs (low and high magnification, respectively) of the PET/Vectra A 70/30 blend processed by the inventive technique.
Figure 5B:
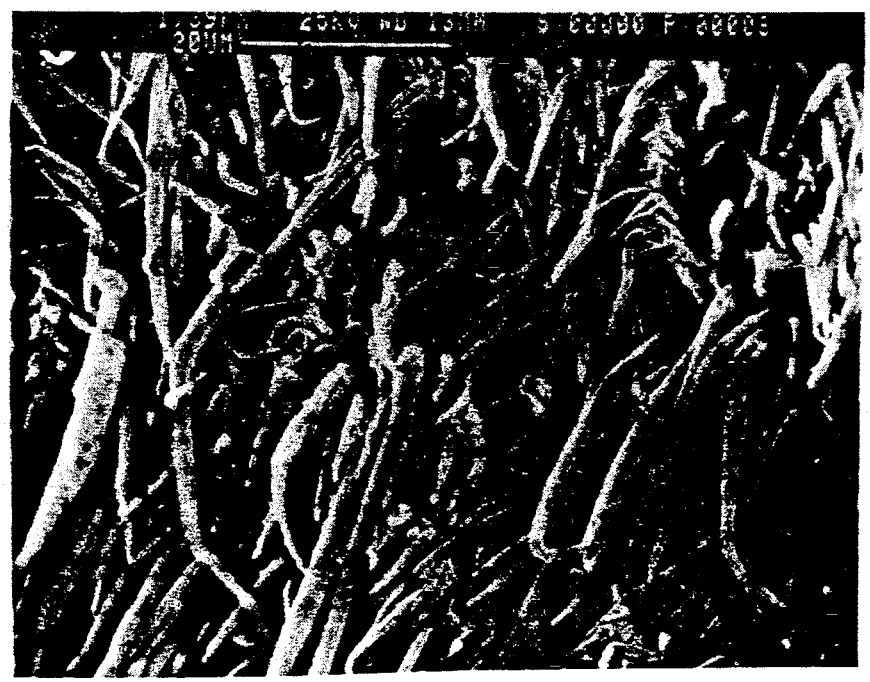
Figure 6A:
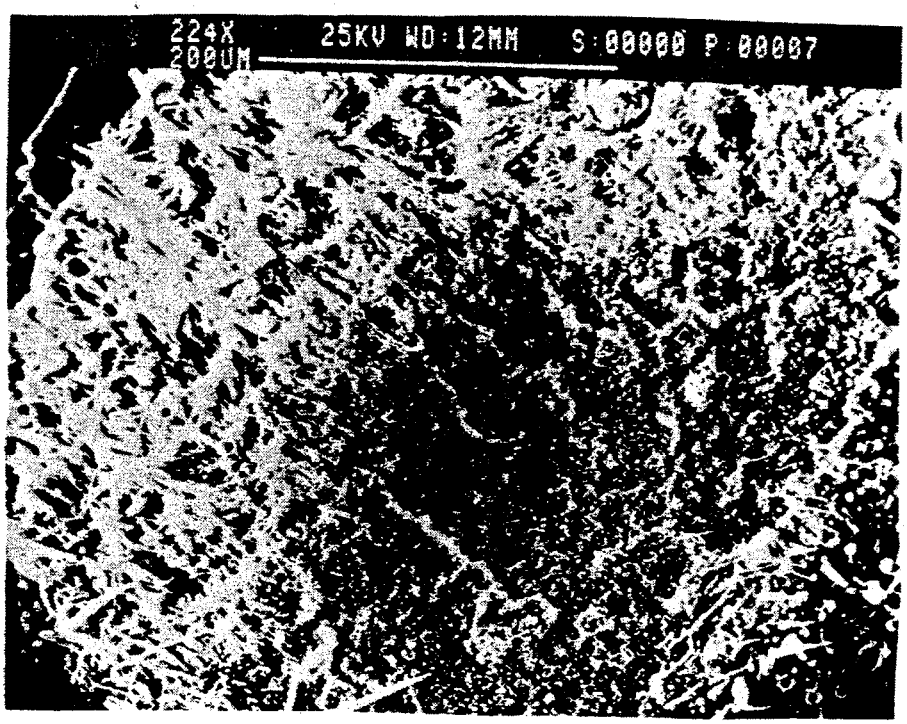
FIGS. 6a–b are scanning electron micrographs (low and high magnification, respectively) of the PET/Vectra A 70/30 blend processed only in a single screw extruder.
Figure 6B:
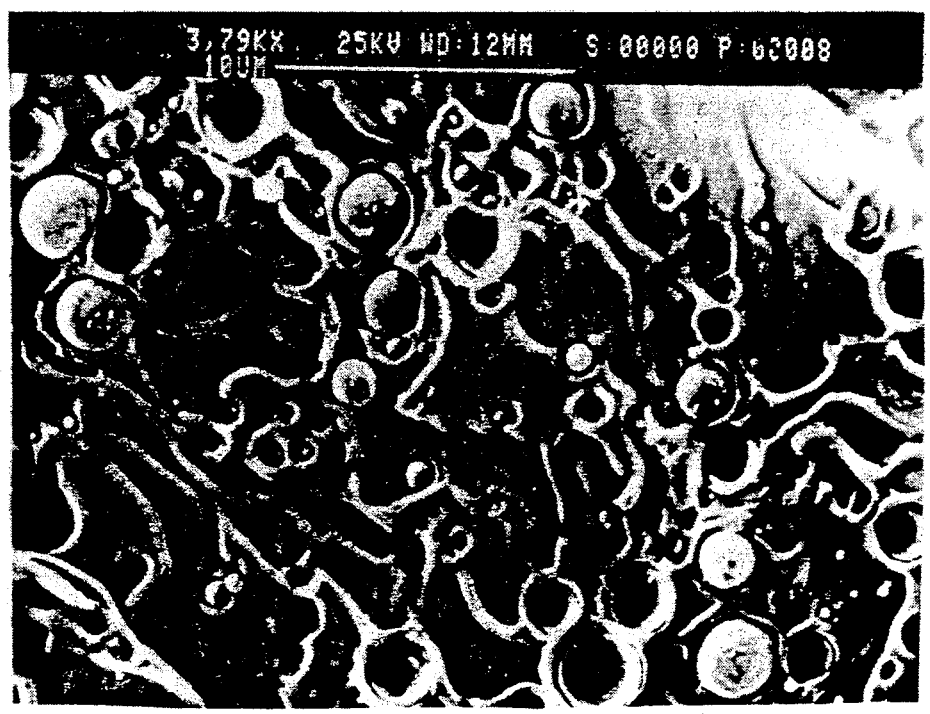

FIGS. 5a and 5b are scanning electron micrographs (SEMs) of the PET/Vectra A900 70/30 strand produced by the inventive technique at a draw ratio of 49.7 and FIGS. 6a and 6b are SEMs of the PET/Vectra A900 70/30 strand produced by the single screw method at a draw ratio of 49 (i.e, these are the two blends compared in FIG. 4). FIGS. 5a and 5b show the morphology of the blend produced by the inventive technique includes high aspect ratio fibrils without any skin-core structure. Conversely, FIGS. 6a and 6b show the morphology of the blend produced by the single screw method has Vectra A900 droplets dispersed in the PET matrix. Hence, the morphology generated by the present invention explains its superior properties noted in FIG. 4.

FIG. 7 shows a photograph of a strand of PET/Vectra A900 70/30 produced by the inventive technique which had been etched in n-propylamine for 72 hours to remove the PET matrix phase. The photograph clearly shows infinitely long Vectra A fibrils as the residue after this process. It should be understood that materials that are not generally considered fiber forming, such as PET and polyethylene, may be combined in the manner described above (i.e, two melt streams combined at a static mixer) and the morphology generated by this technique may have particular advantages in terms of barrier properties or the like.

Figure 8A:
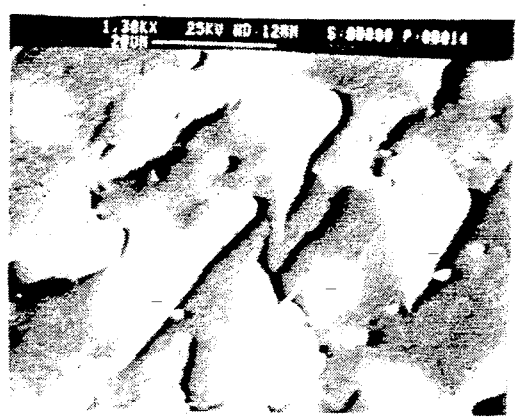
FIGS. 8a–b are scanning electron micrographs of the PET/Vectra A96/4 blend produced by the inventive technique at draw ratios of 2.77 and 26, respectively.
Figure 8B:
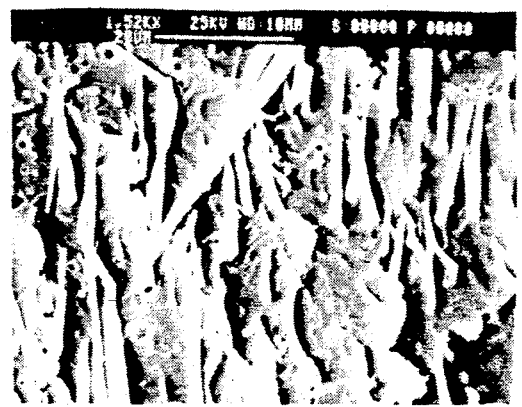

FIGS. 8a–b are SEMs of the fracture surfaces of blends of the PET/Vectra A900 96/4 composition ratio by weight at draw ratios of 2.77 and 26, respectively. FIGS. 8a–b show the LCP fibrillar morphology is achieved even with as low as 4 wt % of the LCP phase in the blend. This is in contrast to what is generally observed, where as much as 10–15 wt % of the LCP phase needs to be present before the LCP fibrillar morphology can be attained. Thus the reinforcing effect of the LCP phase is attained at lower loadings of the LCP than is normally required. The efficacy of the reinforcing effect is shown in FIG. 4.

EXAMPLE 2

Polypropylene has been blended with Vectra A900 and Vectra B950 at varying compositions. The thermal processing temperatures of polypropylene and either Vectra A900 or Vectra B950 do not overlap. The PP used had a melting temperature of 160° C. as determined by differential scanning calorimetry and is normally processed between 180°–220° C. The number average molecular weight, Mn, of the PP is reported to be 120000 with a polydispersity index (Mw/Mn) of 5. The glass transition temperature of PP is about −8° C. Vectra B950 has a melting temperature of 280° C. and is normally processed at between 290°–330° C. With reference back to FIG. 2, blends of PP/Vectra B950 and PP/Vectra A900 were generated using the present invention with the following temperature profile:

PP extruder (matrix extruder 14)—75° C., 150° C., 190° C., and 230° C. in zones 1, 2, 3 and clamp ring, respectively;

Vectra B950 (or A900) extruder (LCP extruder 12)—265° C., 330° C., 300° C., 275° C. in zones 1, 2, 3, and clamp ring, respectively;

Zone 'C1' and 'C2' were maintained at 240° C. and 200° C., respectively;

Static Mixer 10 was maintained at 225° C. throughout; and

Die 18 temperature was maintained at 175° C.

Blends of polypropylene in-situ reinforced with Vectra A and Vectra B were obtained, and in all cases the tensile modulus was increased over that for polypropylene alone. The in-situ fiber reinforcement was also observed with LCP 60, LCP 80, and LCP 60–80, described above.

While the invention has been described in terms of its preferred embodiment where two separate melt streams of different polymeric materials with one material being capable of forming fibers and the other material acting as a matrix are combined using the distributive functions of a static mixer, those skilled in the art will recognize that the invention can be practiced with considerable variation within the spirit and scope of the appended claims.

Having thus described our invention what we claim as new and desire to secure by Letters Patent is as follows:

1. A method for blending polymer materials, comprising the steps of:
   producing a first melt stream of a matrix polymer;
   producing a second melt stream of a liquid crystal polymer separate from said first melt stream;
   combining said first melt stream with said second melt stream prior to any other mixing of said first and second melt streams by dividing said first melt stream and said second melt stream and recombining them in geometrically different configurations with a static mixer or like element to form a blend; and
   allowing liquid crystal polymer fibers to form in-situ in said matrix polymer in said blend.

2. A method as recited in claim 1 wherein said matrix polymer and said fiber forming polymer have overlapping thermal processing ranges such that said steps of producing said first and second melt streams are accomplished at approximately the same temperature.

3. A method as recited in claim 1 wherein said matrix polymer and said fiber forming polymer have non-overlapping thermal processing ranges such that said steps of producing said first and second melt streams are accomplished at divergent temperatures.

4. A method as recited in claim 1 wherein said steps of producing said first and second melt streams include the steps of extruding said first and second melt streams from first and second extruders, respectively.

5. A method as recited in claim 1 wherein said matrix polymer is selected from the group consisting of polypropylene and polyethylene terephthalate.

6. A method as recited in claim 1 wherein said fiber forming polymer is selected from the group consisting of a copolyester of 27 mole % 2-hydroxy-6-naphthoic acid and 73 mole % hydroxybenzoic acid, a liquid crystal polyesteramide composed of 58 mole % 2-hydroxy-6-naphthoic acid, 21 mole % terephthalic acid, and 21 mole % 4'-hydroxy acetanilide, a copolyester comprised of terephthalic acid, hydroquinone, and phenyl hydroquinone, a copolyester of 60–80 mole % polyethylene terephthalate and 20–40 mole % para-hydroxybenzoic acid.

7. A method as recited in claim 1 further comprising the step of passing said blend through a die.

8. A method as recited in claim 1 further comprising the step of pelletizing said blend.

9. A method as recited in claim 1 further comprising the step of cooling said first melt stream before performing said step of dividing.

* * * * *